US012616962B2

(12) United States Patent (10) Patent No.: US 12,616,962 B2
Jeon et al. (45) Date of Patent: *May 5, 2026

(54) CATALYST FOR HYDROGENATION REACTION AND METHOD FOR PRODUCING SAME

(71) Applicant: HANWHA SOLUTIONS CORPORATION, Seoul (KR)

(72) Inventors: Bong Sik Jeon, Daejeon (KR); Yong Hee Lee, Daejeon (KR); Woo Jin Park, Daejeon (KR); Eui Geun Jung, Daejeon (KR); Wan Jae Myeong, Daejeon (KR); Joung Woo Han, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 817 days.

This patent is subject to a terminal disclaimer.

(21) Appl. No.: 17/292,010

(22) PCT Filed: Oct. 29, 2019

(86) PCT No.: PCT/KR2019/014327
§ 371 (c)(1),
(2) Date: May 7, 2021

(87) PCT Pub. No.: WO2020/138684
PCT Pub. Date: Jul. 2, 2020

(65) Prior Publication Data
US 2022/0001360 A1 Jan. 6, 2022

(30) Foreign Application Priority Data
Dec. 28, 2018 (KR) ........................ 10-2018-0173034

(51) Int. Cl.
*B01J 23/755* (2006.01)
*B01J 21/08* (2006.01)
(Continued)

(52) U.S. Cl.
CPC ............. *B01J 23/755* (2013.01); *B01J 21/08* (2013.01); *B01J 35/393* (2024.01); *B01J 35/40* (2024.01);
(Continued)

(58) Field of Classification Search
CPC ...... B01J 23/755; B01J 35/393; B01J 35/615; B01J 35/613; B01J 35/50; B01J 35/40;
(Continued)

(56) References Cited

U.S. PATENT DOCUMENTS 3,743,662 A 7/1973 Jacobus
4,263,225 A 4/1981 Carter
(Continued)

FOREIGN PATENT DOCUMENTS

CN 104588024 A 5/2015
CN 105777528 A 7/2016
(Continued)

OTHER PUBLICATIONS

Karimov, Specific Features of Operation of Nickel as a Component of a Catalyst for Production of Monomers (Year: 2015).*
(Continued)

*Primary Examiner* — In Suk C Bullock
(74) *Attorney, Agent, or Firm* — Harvest IP Law, LLP

(57) ABSTRACT

The present invention can facilitate the reduction of nickel by using copper as an accelerator when a hydrogenation catalyst including nickel is produced by using a deposition-precipitation (DP) method. According to an embodiment of the present invention, provided is a catalyst for a hydrogenation reaction that includes 40-80 parts by weight of nickel
(Continued)

as a catalyst active component, 0.01-5 parts by weight of copper as an accelerator, and 10-30 parts by weight of a silica support based on 100 parts by weight of the entire catalyst. Therefore, although a high content of nickel is supported, the catalyst has a small crystal size of an activated metal and a high degree of dispersion and provides excellent hydrogenation activity. In addition, silica with a controlled particle size distribution is used as a support, so that the produced catalyst also has a uniform particle size distribution and is suppressed from being smashed at a high-speed rotation in the hydrogenation reaction, thereby providing a high filtration rate.

9 Claims, 2 Drawing Sheets

(51) Int. Cl.

| | | |
|---|---|---|
| *B01J 35/30* | (2024.01) | |
| *B01J 35/40* | (2024.01) | |
| *B01J 35/45* | (2024.01) | |
| *B01J 35/61* | (2024.01) | |
| *B01J 35/77* | (2024.01) | |
| *B01J 37/00* | (2006.01) | |
| *B01J 37/03* | (2006.01) | |
| *B01J 37/04* | (2006.01) | |
| *B01J 37/06* | (2006.01) | |
| *B01J 37/08* | (2006.01) | |
| *B01J 37/18* | (2006.01) | |
| *C08F 8/04* | (2006.01) | |
| *C08J 7/12* | (2006.01) | |

(52) U.S. Cl.

CPC ............. *B01J 35/45* (2024.01); *B01J 35/613* (2024.01); *B01J 35/615* (2024.01); *B01J 35/77* (2024.01); *B01J 37/009* (2013.01); *B01J 37/035* (2013.01); *B01J 37/04* (2013.01); *B01J 37/06* (2013.01); *B01J 37/08* (2013.01); *B01J 37/18* (2013.01); *C08F 8/04* (2013.01); *C08J 7/12* (2013.01); *C08J 2323/26* (2013.01)

(58) Field of Classification Search

CPC ........ B01J 21/08; B01J 37/009; B01J 37/035; B01J 37/04; B01J 37/06; B01J 37/08; B01J 37/18; C08F 8/04; C08J 7/12

See application file for complete search history.

(56) References Cited

U.S. PATENT DOCUMENTS

| | | | | |
|---|---|---|---|---|
| 4,666,635 | A * | 5/1987 | Klimmek | ................. B01J 35/23 |
| | | | | 554/147 |
| 11,878,286 | B2 * | 1/2024 | Park | ....................... B01J 37/035 |
| 11,987,659 | B2 * | 5/2024 | Jeon | ....................... B01J 35/647 |
| 11,999,911 | B2 * | 6/2024 | Park | ....................... B01J 35/647 |
| 2007/0135301 | A1 * | 6/2007 | Holcomb | .............. B01J 23/755 |
| | | | | 502/259 |
| 2013/0109875 | A1 * | 5/2013 | Bouwman | ................ B01J 33/00 |
| | | | | 554/146 |
| 2016/0008792 | A1 * | 1/2016 | Cortes Jacome | ...... B01J 35/638 |
| | | | | 502/170 |

FOREIGN PATENT DOCUMENTS

| | | | |
|---|---|---|---|
| EP | 3733288 | A1 | 11/2020 |
| EP | 3733820 | A1 | 11/2020 |
| JP | 2002275212 | A | 9/2002 |
| JP | 2002275212 | B2 | 5/2012 |
| KR | 19980002906 | A | 5/1988 |
| KR | 1020020024713 | A | 4/2002 |
| KR | 1020020075772 | A | 10/2002 |
| KR | 1020090064455 | A | 6/2009 |
| KR | 1020140096279 | A | 8/2014 |
| KR | 102017003425 | A | 1/2017 |
| KR | 1020190081127 | A | 7/2019 |

OTHER PUBLICATIONS

Liu Guiyan et al., "Inorganic and Analytical Chemistry Experiment", Central China Normal University Press, pp. 47, Aug. 31, 2018.

An Office Action issued on Jan. 8, 2024 in the corresponding Chinese Patent Application.

Q.Wu et al., Catal. Sci. Technol., 2014, 4, 378-386 (Nov. 4, 2013). Principle of industrial catalysis / Edited by Li Yumin / p. 157-157 / ISBN : 7-5618-0382-6.

An Office Action issued on Sep. 4, 2023 in the corresponding Chinese Patent Application.

Zhang Jiguang, 'Catalyst Preparation Process Technology', China Petrochemical Press, pp. 1-10 (Dec. 31, 2004).

Yu Ciyun et al., Proceedings of the 2003 China Petroleum Processing Technology Conference, Compiled by the China Society for Petrochemical Information, Petroleum Processing Branch—Dalian: Dalian Publishing House., pp. 21, Oct. 2003.

An Office Action issued on Apr. 10, 2024 in the corresponding Chinese Patent Application.

* cited by examiner

CATALYST FOR HYDROGENATION REACTION AND METHOD FOR PRODUCING SAME

CROSS-REFERENCE TO RELATED APPLICATIONS

This application is a National Stage of International Application No. PCT/KR2019/014327 filed Oct. 29, 2019, claiming priority based on Korean Patent Application No. 10-2018-0173034 filed Dec. 28, 2018.

TECHNICAL FIELD

The present invention relates to a nickel hydrogenation catalyst and a method for producing the same, and more particularly, to a catalyst with improved activity, in which copper is used as an accelerator when a hydrogenation catalyst including nickel is produced using a deposition-precipitation (DP) method. Accordingly, the catalyst according to the present invention may be provided in a hydrocarbon resin hydrogenation process.

BACKGROUND ART

Naphtha cracking is an important process for the production of basic intermediates, such as lower olefins (i.e., ethylene, propylene, butylene, and butadiene) and aromatic compounds (i.e., benzene, toluene, and xylene), which are widely used in the petrochemical and chemical industries. Thermal cracking or steam pyrolysis is the main type of process that is typically performed for forming these materials in the presence of steam and in the absence of oxygen. The feedstock may include, in addition to naphtha, petroleum gases and distillates such as kerosene and gas oil. At this time, naphtha or the like may be pyrolyzed to produce materials such as C4 fraction including ethylene, propylene, butane, and butadiene, C5 fraction including dicyclopentadiene, isoprene, and piperylene, cracked gasoline (including benzene, toluene, and xylene), cracked kerosene (C9 or more fractions), cracked heavy oil (ethylene bottom oil), and hydrogen gas. Of these materials, hydrocarbon resins may be produced by polymerizing C5 and C9 fractions.

Hydrocarbon resins among the C5 fractions include dicyclopentadiene (DCPD) as a main ingredient and may copolymerize propylene, isoprene, styrene, and the like. However, since hydrocarbon resins include unsaturated bonds in part, hydrocarbon resins have a yellow or orange color and have a peculiar bad smell of hydrocarbon resins. At this time, if a hydrogenation process of adding hydrogen is performed, unsaturated bonds are removed so that the color becomes brighter and the odor peculiar to hydrocarbon resins decreases, resulting in an improvement in quality. Hydrocarbon resins, from which unsaturated bonds are removed, are called water-white resins because they are colorless and transparent, and are distributed as high-quality resins with excellent heat resistance and ultraviolet (UV) stability.

In the hydrocarbon resin hydrogenation process, the application of a hydrogenation catalyst is essential. As a hydrocarbon resin hydrogenation catalyst, noble metals such as palladium, platinum, and rhodium or transition metals such as nickel and cobalt are used as active ingredients, and the form supported by silica, alumina, activated carbon, titania, or the like is applicable.

Korean Patent Publication No. 10-2017-0003425 discloses a result of using palladium as a hydrocarbon resin hydrogenation catalyst.

In addition, Korean Patent Publication No. 1988-0002906 discloses a results of using a catalyst supporting palladium on a carbon support and a catalyst supporting nickel on an inert support as a hydrocarbon resin hydrogenation catalyst.

A catalyst including nickel has an advantage of having high activity in a hydrogenation reaction, compared to catalysts including other transition metals. However, at least 40 wt % of nickel may be included in order to secure the activity of catalyst in a hydrocarbon resin hydrogenation reaction. In the case in which nickel is supported on a support, as the content of nickel is higher, the dispersibility is lowered, resulting in an increase in a crystal size of nickel. Accordingly, the activity of catalyst is decreased. If the content of nickel is lowered in order to prevent the above-described problem, the dispersibility is relatively improved, but the activity is decreased. Therefore, it is necessary to support a high content of nickel and to maintain the crystal of nickel in an appropriate size.

On the other hand, a hydrocarbon resin hydrogenation reaction is performed by dispersing a powdery hydrogenation catalyst in a reactant solution, in which a hydrocarbon resin is dissolved, and then rotating at high speed. Since the catalyst is mixed in the solution, a filter is installed at an outlet of a reactor to separate the product solution from the catalyst. Since the product solution is filtered and separated through a catalyst layer on the filter surface, the filterability of the catalyst is one of the important indicators that determine the stable operation of the process. The filterability of the catalyst is generally determined by a catalyst particle size distribution. As a particle size increases, a pore volume between particles increases, resulting in an increase in filterability. In particular, since the pore size of the filter that separates the catalyst from the product solution is about 1 μm, the pores of the filter are blocked when the proportion of catalyst particles having a size of 1 μm or less is high, and the filterability is greatly reduced.

In addition, since the powdery catalyst is dispersed in the solution and rotated at high speed, the catalyst is pulverized as the operation time elapses. Thus, the average particle size of the catalyst continuously decreases and the proportion of catalyst particles having a size of 1 μm or less increases. Therefore, a hydrocarbon resin hydrogenation catalyst has to have high filterability for a hydrocarbon resin solution having a high viscosity, and the generation of particles having a size of 1 μm or less has to be suppressed even after high-speed pulverization.

Therefore, there is an urgent need to develop a catalyst suitable for a hydrocarbon resin hydrogenation reaction that can overcome the above-described problems.

(Patent Literature 1) Korean Patent Publication No. 10-2017-0003425

(Patent Literature 2) Korean Patent Publication No. 1988-0002903

DESCRIPTION OF EMBODIMENTS

Technical Problem

The present invention aims to solve the above-described problems.

An object of the present invention is to provide a hydrocarbon resin hydrogenation catalyst including a high content of nickel of at least 40 parts by weight based on 100 parts by weight of the entire catalyst.

Another object of the present invention is to reduce a crystal size of nickel and increase dispersibility to improve the activity of the catalyst.

Another object of the present invention is to provide a catalyst that provides a high degree of reduction at a low temperature of 300-450° C.

Another object of the present invention is to provide a catalyst having a uniform catalyst particle size distribution and suppress particles from being smashed at a high-speed rotation in a hydrogenation reaction. Accordingly, the filterability in a hydrocarbon resin hydrogenation reaction is improved.

Solution to Problem

In order to achieve the above-described objects of the present invention and achieve the characteristic effects of the present invention described below, the characteristic construction of the present invention is as follows.

According to an embodiment, a catalyst for a hydrogenation reaction includes 40-80 parts by weight of nickel as a catalyst active component, 0.01-5 parts by weight of copper as an accelerator, and 10-30 parts by weight of a silica support based on 100 parts by weight of the entire catalyst.

According to an embodiment of the present invention, a crystal size of the nickel is 3-8 nm.

The catalyst has a degree of reduction of 80% or more after removal of a passivation layer and a surface area of 150-300 m²/g.

In addition, an average particle size ($d_{50}$) of the catalyst is 3-10 μm, and a volume ratio of the catalyst having a particle size of 1 μm or less is 10% or less.

According to an embodiment of the present invention, the catalyst has a specific surface area of 200-400 m²/g and an average particle size of 3-10 μm.

According to an embodiment of the present invention, a catalyst precursor forms a precipitation to provide a hydrogenation catalyst supported on a support, and may be preferably produced by a deposition-precipitation (DP) method. The produced catalyst may be provided as a catalyst that hydrogenates a hydrocarbon resin through a hydrogenation reaction.

According to an embodiment of the present invention, a method for producing a catalyst for a hydrogenation reaction includes: preparing a first solution by dissolving a nickel precursor in a solvent so that a weight concentration (g/L) of nickel in a solution is 25-250; preparing a second solution by adding a copper precursor to the first solution so that a weight concentration (g/L) of copper in a solution is 0.01-5; preparing a third solution by dispersing a silica support in the second solution so that a weight concentration (g/L) of silica in a solution is 10-40; adding the third solution to a precipitation container, stirring the third solution, and heating the third solution to a temperature of 50-120° C.; adding a pH control agent to the heated third solution, causing the nickel and copper precursors to form a precipitate, and depositing the precipitate on the solid silica support; washing and filtering the supported catalyst and drying the supported catalyst at 100-200° C. for 5-24 hours; sintering the dried catalyst in air at a temperature of 200-500° C.; and activating the sintered catalyst by reducing the sintered catalyst at a temperature of 200-500° C. in a hydrogen atmosphere.

The method may further include passivating the activated catalyst. In this case, the passivating is performed by passivating the activated catalyst with a nitrogen mixed gas including 0.1-20% oxygen or by depositing the activated catalyst in a solution including a hydrocarbon resin.

According to an embodiment of the present invention, provided is a method for hydrogenating a hydrocarbon resin, wherein a hydrocarbon resin is brought into contact with hydrogen in the presence of the catalyst produced by the method described above.

Advantageous Effects of Disclosure

The present invention has an effect of providing a catalyst having excellent activity by adding copper as an accelerator to nickel that is a catalyst active component.

In addition, the present invention provides a high degree of dispersion and a small nickel crystal size suitable for a reaction.

According to the present invention, since the catalyst is produced by a deposition-precipitation (DP) method, a high content of nickel of at least 40 parts by weight based on 100 parts by weight of the entire catalyst may be uniformly supported.

The catalyst according to the present invention provides a high degree of reduction at a temperature of 300-450° C., which is relatively low compared to a conventional reaction.

The catalyst according to the present invention provides a uniform particle size distribution of the catalyst produced by applying silica having a uniform particle size distribution as a support, thereby suppressing catalyst particles from being smashed at a high-speed rotation in a hydrogenation reaction. Therefore, the present invention provides an effect of improving a filtration rate in a hydrogenation reaction.

BEST MODE

Figure 1:
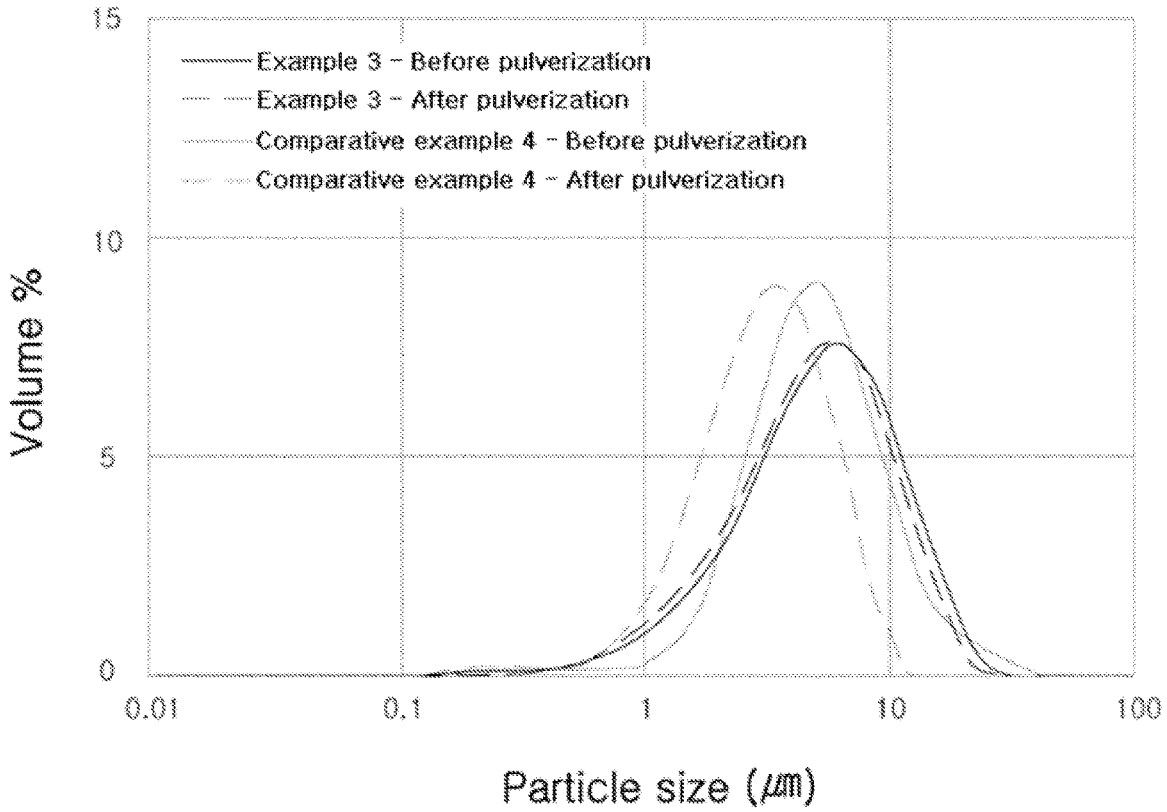
FIG. 1 shows a result of measuring a particle size distribution of a catalyst according to the present invention.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained. In the drawings, similar reference numerals refer to the same or similar functions throughout various aspects.

Hereinafter, embodiments of the present invention will be described with reference to the accompanying drawings, so that those of ordinary skill in the art can easily carry out the present invention.

According to a deposition-precipitation (DP) method, a metal precursor salt solution and a pH control agent react in a support dispersion to produce precipitates, and the precipitates are adsorbed and solidified on the surface of the support. It was confirmed that the uniformity of the catalyst produced by the DP method was remarkable so that it could not be compared with metal catalysts produced by conventional coprecipitation and impregnation methods. In addition, there is an advantage in that it is easy to select and optimize a support having a particle size, size distribution, surface area, pore structure, or the like suitable for a reaction.

Catalysts including nickel have high activity in a hydrogenation reaction, compared to catalysts including other metals. In the case in which a nickel precursor is supported on a support by a DP method, as the content of nickel is higher, the crystal size increases and the dispersibility decreases. Thus, the activity of the catalyst is lowered. In order to prevent these problems, if the content of nickel is decreased, the dispersibility is relatively improved, but the activity is lowered. Accordingly, it is impossible to produce a commercially available nickel-supported catalyst by a DP method. In addition, the existing DP method generally provides activation of a catalyst by performing a reduction reaction at a high temperature of 450° C. or higher.

According to an embodiment of the present invention, copper is added as an accelerator, and thus it is possible to obtain a high degree of reduction at a low temperature of 300-450° C., compared to the existing known methods. Also, even if supported by the DP method, a catalyst having a small crystal size and a high degree of dispersion may be provided in spite of a high content of nickel after reduction, thereby providing excellent activity in the hydrogenation reaction.

An embodiment of the present invention provides a catalyst for a hydrogenation reaction, which includes 40-80 parts by weight of nickel as a catalyst active component, 0.01-5 parts by weight of copper as an accelerator, and 10-30 parts by weight of a silica support based on 100 parts by weight of the entire catalyst.

Preferably, nickel is provided in an amount of 50-70 parts by weight, and copper is provided in an amount of 0.05-2 parts by weight.

In this case, a nickel precursor includes nickel and metal salts such as nitrate, acetate, sulfate, and chloride. Most preferably, a nickel sulfate precursor including sulfate is provided as the nickel precursor.

In addition, a copper precursor is also bonded to metal salts such as nitrate, acetate, sulfate, chloride, or combinations thereof. Most preferably, a copper sulfate precursor including sulfate is used as the copper precursor. However, the present invention is not limited thereto.

A hydrogenation catalyst according to an embodiment of the present invention may be mixed in a solvent by using a nickel compound and an accelerator in a powder form. A solid support may be suspended in the solvent, and the nickel compound and the accelerator may form a precipitate and may be deposited on the solid support.

According to an embodiment of the present invention, the crystal size of nickel is 3-8 nm. Compared to a catalyst produced by a conventional coprecipitation method or the like, the catalyst according to the present invention may control the crystal size of nickel in a range of 3-8 nm and maintain high dispersibility.

In addition, according to an embodiment of the present invention, an average particle size ($d_{50}$) of the catalyst is 3-10 μm, and a volume ratio of the catalyst having a particle size of 1 μm or less is 10% or less. Therefore, this may prevent filterability from deteriorating due to clogging of filter pores in a hydrogenation reaction process.

In addition, according to an embodiment of the present invention, a specific surface area of the catalyst is in a range of 150-300 $m^2/g$. The hydrogenation reaction in the above range may provide an effect of contributing to improving the activity of the catalyst.

According to an embodiment of the present invention, the silica support has a specific surface area of 200-400 $m^2/g$ and an average particle size of 3-10 μm. Preferably, the silica support has a specific surface area of 300-350 $m^2/g$ and an average particle size of 4-7 μm. The catalyst produced by applying silica having a uniform particle size distribution as a support also has a uniform particle size distribution, and the size of the catalyst may also be adjusted, thereby providing an effect of suppressing particles from being smashed at a high-speed rotation. Therefore, it is possible to prevent filterability from deteriorating due to a reduction in the proportion of particles having a size of 1 μm or less.

In addition, according to an embodiment of the present invention, the catalyst has a degree of reduction of 80% or more after removal of a passivation layer. Even if the catalyst is produced by the DP method, since copper is included as an accelerator in a high content of the nickel catalyst according to the present invention, it is possible to provide an effect of having a high degree of reduction of 80% or more when the reduction is performed at a relatively low temperature of 300-450° C., and preferably at 400° C.

According to an embodiment of the present invention, a method for producing a catalyst for a hydrogenation reaction includes: preparing a first solution by dissolving a nickel precursor in a solvent so that a weight concentration (g/L) of nickel in a solution is 25-250; preparing a second solution by adding a copper precursor to the first solution so that a weight concentration (g/L) of copper in a solution is 0.01-5; preparing a third solution by dispersing a silica support in the second solution so that a weight concentration (g/L) of silica in a solution is 10-40; adding the third solution to a precipitation container, stirring the third solution, and heating the third solution to a temperature of 50-120° C.; adding a pH control agent to the heated third solution, causing the nickel and copper precursors to form a precipitate, and depositing the precipitate on the solid silica support; washing and filtering the supported catalyst and drying the supported catalyst at 100-200° C. for 5-24 hours; sintering the dried catalyst in air at a temperature of 200-500° C.; and activating the sintered catalyst by reducing the sintered catalyst at a temperature of 200-500° C. in a hydrogen atmosphere. In this case, optimal activity may be exhibited when the reduction temperature is 200-500° C., preferably 300-450° C., and more preferably 300° C., as described above.

Furthermore, the method may further include passivating the activated catalyst. In this case, the passivating may be performed by passivating the activated catalyst with a nitrogen mixed gas including 0.1-20% oxygen or by depositing the activated catalyst in a solution including a hydrocarbon resin.

In addition, the precipitation of the catalyst precursor may be performed in an environment of pH 7 or higher, and preferably pH 7-9, by addition of a base or electrochemical means. In this case, for the addition of the base, a basic compound may be added. A basic additive may include sodium carbonate, sodium hydroxide, sodium hydrogen carbonate, or a hydrate thereof, but the present invention is not limited thereto. Preferably, the basic additive may include sodium carbonate or a hydrate thereof.

The catalyst according to the present invention may be in a powder form, a particle form, or a granular form. Preferably, the catalyst according to the present invention is in a powder form.

In addition, the hydrogenation catalyst according to an embodiment of the present invention may hydrogenate a hydrocarbon resin including C5 or C9 petroleum fractions, by-products, and combinations thereof through distillation, pretreatment, and polymerization.

The hydrocarbon resin may be hydrogenated at a temperature of 100-400° C., and preferably 200-300° C., and at a pressure of 1-200 bar, and preferably 30-100 bar. The hydrogenation time may depend primarily on the temperature, the amount of catalyst, and the degree of hydrogenation. The hydrogenation reaction may be performed in various reactors. Preferably, the hydrogenation reaction may be performed in a continuous stirred tank reactor (CSTR) or a loop reactor.

As described above, the hydrogenation catalyst according to the present invention may produce a catalyst for a hydrogenation reaction by a DP method while copper is used as an accelerator in a high nickel content of a catalyst active component. In particular, the silica support may be selected to optimize the pore structure and particle size distribution. Therefore, the activity of the catalyst may be increased.

In addition, compared to the conventional methods, a high degree of reduction may be provided at a relatively low temperature, and a small nickel size and a uniform distribution may be provided. Thus, excellent catalytic activity may be provided.

Furthermore, silica having a uniform particle size distribution may be applied to provide an effect of suppressing the catalyst from being smashed at a high-speed rotation in the hydrogenation reaction.

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

EXAMPLES

Example 1

40 mL of a solution, in which 1 g of a porous silica powder having a surface area of 300 m$^2$/g, a pore size of 21 nm, and an average particle size of 4 µm, nickel chloride (75 g/L nickel), and copper chloride (1.0 g/L copper) were dissolved in distilled water, was added to a precipitation container, stirred, and heated to a temperature of 80° C. After the temperature reached 80° C., 40 mL of a sodium carbonate (144 g/L) solution was all injected within 1 hour by using a syringe pump. After completion of precipitation, a slurry had a pH of 7.5, was washed with about 1.5 L of distilled water, filtered, and then dried at 120° C. for 8 hours or more by using a drying oven. After this was subdivided, a catalyst was activated by performing reduction at a temperature of 400° C. in a hydrogen atmosphere. The activated catalyst was passivated using a nitrogen mixed gas including 1% oxygen to produce a hydrogenation catalyst. In the catalyst raw material, a mass ratio of nickel to silica was 3.0, and a mass ratio of copper to silica was 0.04.

Example 2

1,875 mL of a solution, in which 37.5 g of a porous silica powder having a surface area of 310 m$^2$/g, a pore size of 25 nm, and an average particle size of 7 µm, nickel sulfate (497.1 g/L), and copper sulfate (4.06 g/L) were dissolved in distilled water, was added to a precipitation container, stirred, and heated to a temperature of 80° C. After the temperature reached 80° C., 1,500 mL of a sodium carbonate (174.6 g/L) solution was all injected within 1 hour by using a syringe pump. After completion of precipitation, a slurry had a pH of 7.5, was washed with about 5 L of distilled water, filtered, and then dried at 100° C. for 8 hours or more by using a drying oven. After this was subdivided, a catalyst was activated by performing reduction at a temperature of 400° C. in a hydrogen atmosphere. The activated catalyst was passivated using a nitrogen mixed gas including 1% oxygen to produce a hydrogenation catalyst. In the catalyst raw material, a mass ratio of nickel to silica was 3.0, and a mass ratio of copper to silica was 0.04.

Example 3

A hydrogenation catalyst was produced in the same manner as in Example 2, except that a reduction temperature was changed to 420° C.

Example 4

A hydrogenation catalyst was produced in the same manner as in Example 2, except that a reduction temperature was changed to 440° C.

Comparative Example 1

40 mL of a solution, in which 1 g of a porous silica powder having a surface area of 300 m$^2$/g and a pore size of 21 nm and nickel nitride (75 g/L nickel) were dissolved in distilled water, was added to a precipitation container, stirred, and heated to a temperature of 80° C. After the temperature reached 80° C., 40 mL of a sodium carbonate (144 g/L) solution was all injected within 1 hour by using a syringe pump. After completion of precipitation, a slurry had a pH of 7.5, was washed with about 1.5 L of distilled water, filtered, and then dried at 120° C. for 8 hours or more by using a drying oven. After this was subdivided, a catalyst was activated by performing reduction at a temperature of 400° C. in a hydrogen atmosphere. The activated catalyst was passivated using a nitrogen mixed gas including 1% oxygen to produce a hydrogenation catalyst. In the catalyst raw material, a mass ratio of nickel to silica was 3.0.

Comparative Example 2

40 mL of a solution, in which 1 g of a porous silica powder having a surface area of 300 m$^2$/g and a pore size of 21 nm, nickel nitride (85 g/L nickel), and magnesium nitrate (2.1 g/L magnesium) were dissolved in distilled water, was added to a precipitation container, stirred, and heated to a temperature of 80° C. After the temperature reached 80° C., 40 mL of a sodium carbonate (144 g/L) solution was all injected within 1 hour by using a syringe pump. After completion of precipitation, a slurry had a pH of 7.5, was washed with about 1.5 L of distilled water, filtered, and then dried at 120° C. for 8 hours or more by using a drying oven. After this was subdivided, a catalyst was activated by performing reduction at a temperature of 400° C. in a hydrogen atmosphere. The activated catalyst was passivated using a nitrogen mixed gas including 1% oxygen to produce a hydrogenation catalyst. In the catalyst raw material, a mass ratio of nickel to silica was 3.4, and a mass ratio of magnesium to silica was 0.084.

Comparative Example 3

40 mL of a solution, in which nickel nitrate (75 g/L nickel) and sodium silicate (50 g/L silicon) were dissolved in distilled water, was added to a precipitation vessel, stirred, and heated to a temperature of 80° C. After the temperature reached 80° C., 40 mL of a sodium carbonate (144 g/L) solution was all injected within 1 hour by using a syringe pump. After completion of precipitation, a slurry was washed with about 1.5 L of distilled water, filtered, and then dried at 120° C. for 8 hours or more by using a drying oven. After this was subdivided, a catalyst was activated by performing reduction at a temperature of 400° C. in a hydrogen atmosphere. The activated catalyst was passivated using a nitrogen mixed gas including 1% oxygen to produce a hydrogenation catalyst. In the catalyst raw material, a mass ratio of nickel to silica was 3.0.

Experimental Example 1. Measurement of Nickel Crystal Size in Catalyst

Table 1 below shows the content of nickel, the type and content of the accelerator, the reduction temperature, and the nickel crystal size in the catalyst compositions of Example 1 and Comparative Examples 1 to 4.

TABLE 1

| | Content of Ni (parts by weight) | Accelerator (parts by weight) | Content of accelerator (parts by weight) | Reduction temperature (° C.) | Ni crystal size (nm) |
|---|---|---|---|---|---|
| Example 1 | 62.9 | Cu | 0.71 | 400 | 6.6 |
| Comparative Example 1 | 68.9 | — | — | 400 | 11.4 |

It was confirmed that the nickel crystal size of Example 1 in which copper was supported on the silica support together with nickel was significantly reduced, compared to Comparative Example 1 in which only nickel was supported on the silica support.

Experimental Example 2. Catalyst Activity Test

A 300 mL autoclave including a hollow shaft stirrer and having a stirring speed of 1,600 rpm was used.

75 g of a solution, in which 30 wt % of a non-hydrogenated hydrocarbon resin was dissolved in Exxsol D40, was hydrogenated by adding a catalyst of 0.5% relative to the mass of the hydrocarbon resin at 230° C. and 60 bar. The activity was compared by measuring the amount of hydrogen consumption for 30 minutes after the start of the reaction. The amount of hydrogen consumption is shown in Table 2 below.

TABLE 2

| | Amount of hydrogen consumption ($\Delta P$, atm) |
|---|---|
| Example 1 (Ni—Cu/SiO$_2$) | 6.9 |
| Comparative Example 1 (Ni/SiO$_2$) | 3.1 |
| Comparative Example 3 (Ni—Mg/SiO$_2$) | 5.8 |

As shown in Table 2, when a copper accelerator is added, the catalyst has a relatively small nickel crystal size even when a high content of nickel is supported. Accordingly, it can be confirmed that the hydrogenation activity of the hydrocarbon resin has a higher value, compared to Comparative Examples 1 and 2.

Experimental Example 3. Catalyst Activity Test

A 300 mL autoclave including a hollow shaft stirrer and having a stirring speed of 1,600 rpm was used.

75 g of a solution, in which 30 wt % of a non-hydrogenated hydrocarbon resin was dissolved in Exxsol D40, was hydrogenated by adding a catalyst of 0.5% relative to the mass of the hydrocarbon resin at 270° C. and 90 bar. The activity was compared by measuring the amount of hydrogen consumption for 30 minutes after the start of the reaction. The amount of hydrogen consumption is shown in Table 3 below.

TABLE 3

| | Amount of hydrogen consumption ($\Delta P$, atm) |
|---|---|
| Example 1 (Ni—Cu/SiO$_2$) | 7.9 |
| Comparative Example 1 (Ni/SiO$_2$) | 6.4 |

It can be confirmed that the hydrocarbon resin hydrogenation activity in Example 1 was higher than that in Comparative Example 1 even though the experiment was conducted under high temperature and high pressure conditions compared to Experimental Example 2.

Experimental Example 4. Catalyst Activity Test

A 300 mL autoclave including a hollow shaft stirrer and having a stirring speed of 1200 rpm was used.

75 g of a solution, in which 30 wt % of a non-hydrogenated hydrocarbon resin was dissolved in Exxsol D40, was hydrogenated by adding a catalyst of 0.5% relative to the mass of the hydrocarbon resin at 230° C. and 90 bar. The activity was compared by measuring the amount of hydrogen consumption for 30 minutes after the start of the reaction. The amount of hydrogen consumption is shown in Table 4 below.

TABLE 4

| | Amount of hydrogen consumption ($\Delta P$, atm) |
|---|---|
| Example 1 (Ni—Cu/SiO$_2$) | 7.9 |
| Comparative Example 1 (Ni/SiO$_2$) | 8.2 |
| Comparative Example 3 (Ni coprecipitation) | 8.3 |

It was confirmed that, compared to Example 1 in which the porous silica powder having a surface area of 300 m$^2$/g, a pore size of 21 nm, and an average particle size of 4 μm was applied as the support, the hydrogenation activity of Example 2 in which the porous silica powder having a surface area of 310 m$^2$/g, a pore size of 25 nm, and an average particle size of 7 μm was applied as the support was higher and was similar to Comparative Example 3 produced by the coprecipitation method.

Experimental Example 5. Catalyst Activity Test

A 300 mL autoclave including a hollow shaft stirrer and having a stirring speed of 1200 rpm was used.

75 g of a solution, in which 30 wt % of a non-hydrogenated hydrocarbon resin was dissolved in Exxsol D40, was hydrogenated by adding a catalyst of 0.5% relative to the mass of the hydrocarbon resin at 230° C. and 90 bar. The experiment was repeated twice by using the same catalyst. The activity was compared by measuring the amount of hydrogen consumption for 1 hour after the start of the reaction. The amount of hydrogen consumption is shown in Table 5 below.

TABLE 5

| | Reduction temperature | Amount of hydrogen consumption ($\Delta P$, atm) | |
|---|---|---|---|
| | (° C.) | 1 회 | 2 회 |
| Example 2 (Ni—Cu/SiO$_2$) | 400 | 7.5 | 8.3 |
| Example 3 (Ni—Cu/SiO$_2$) | 420 | 7.2 | 8.4 |
| Example 4 (Ni—Cu/SiO$_2$) | 440 | 7.3 | 8.0 |

It was confirmed that the hydrogenation activity and lifetime of Example 3 reduced at 420° C. among Examples 2 to 4 were the most excellent.

Experimental Example 6. Analysis of Catalyst Properties

Table 6 below shows the content of nickel in the catalyst compositions of Examples 1 to 4, the reduction temperature, the specific surface area, the nickel crystal size, and the degree of reduction and average particle size after removal of the passivation layer.

TABLE 6

| | Content of Ni (parts by weight) | Reduction temperature (° C.) | Ni crystal size (nm) | Degree of reduction after removal of passivation layer (%) | Average particle size (μm) |
|---|---|---|---|---|---|
| Example 1 | 62.9 | 400 | 6.6 | — | — |
| Example 2 | 60.9 | 400 | 4.8 | 83.4 | 6.1 |
| Example 3 | 62.3 | 420 | 4.9 | 85.3 | 6.2 |
| Example 4 | 62.8 | 440 | 5.2 | 89.9 | 6.1 |

It was confirmed that the nickel crystal sizes of Examples 2 to 4 in which the porous silica powder having a surface area of 310 m$^2$/g, a pore size of 25 nm, and an average particle size of 7 μm was applied as the support were small, compared to Example 1 in which the porous silica powder having a surface area of 300 m$^2$/g, a pore size of 21 nm, and an average particle size of 4 μm was applied as the support. It was confirmed that the specific surface area of Example 3 among Examples 2 to 4 was the largest. As the reduction temperature increases, the nickel crystal size and the degree of reduction after removal of the passivation layer also increase. It is determined that, although the degree of reduction of Example 3 is lower than that of Example 4, the specific surface area of Example 3 is larger and the nickel crystal size is smaller, so that higher hydrogenation activity is exhibited.

Experimental Example 7. Measurement of Catalyst Particle Size Distribution 0.36 g of a catalyst was added to 30 g of a solution in which 60 wt % of a non-hydrogenated hydrocarbon resin was dissolved in Exxsol D40, and was pulverized for 1 hour at 18,000 rpm by using a homogenizer. After the pulverization, a part of the solution was subdivided and the particle size of the catalyst was measured. The particle size distribution measurement results are shown in FIG. 1 and Table 7.

TABLE 7

| | Example 2 | | Comparative Example 3 | | |
|---|---|---|---|---|---|
| Item | Before pulverization | After pulverization | Item | Before pulverization | After pulverization |
| $d_{10}$(μm) | 1.8 | 1.7 | $d_{10}$(μm) | 2.2 | 1.3 |
| $d_{10}$(μm) | 5.5 | 5.1 | $d_{10}$(μm) | 5.0 | 3.2 |
| $d_{10}$(μm) | 12.9 | 11.6 | $d_{10}$(μm) | 11.3 | 6.5 |
| Proportion of particles having size of 1 μm or less (&) | 4.4 | 4.5 | Proportion of particles having size of 1 μm or less (&) | 2.7 | 7.6 |

It was confirmed that, compared to Comparative Example 3 produced by the coprecipitation method, the smashing of particles was suppressed in Example 3 produced by supporting nickel on the silica support by the DP method.

Experimental Example 8. Experiment to Confirm Filterability of Catalyst

A filter paper having a pore size of 0.5 μm was put into a joint-connected solid suspension filtration device and then fastened, and a pressure in a flask of the filtration device was maintained at 100 mbar by using a vacuum pump.

Figure 2:
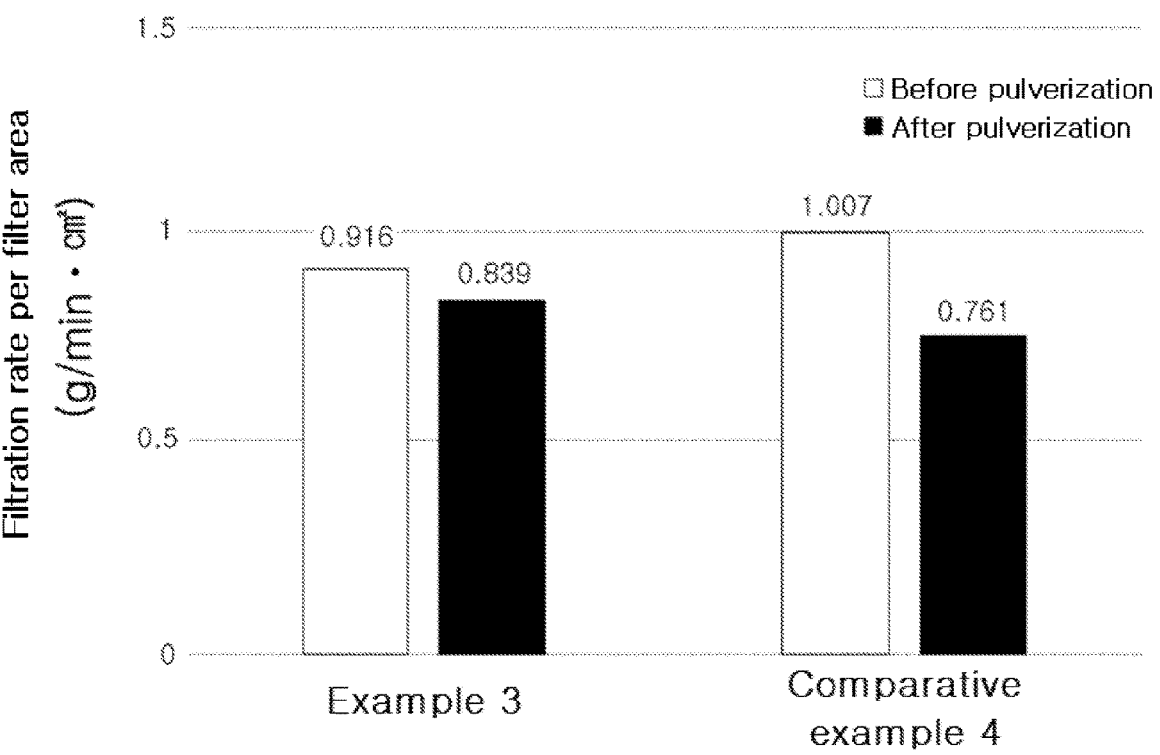
FIG. 2 shows a result of measuring filterability of the catalyst according to the present invention.

After the pulverization of Experimental Example 7, 20 g of the solution was taken and stored in an oven at 100° C. for 10 minutes, the heated solution was poured into the filtering device and the weight of the hydrocarbon resin solution filtered for 2 minutes was measured. A filtration rate was calculated by dividing the amount of the filtered solution by the time and the area of the filter. The filtration rate measurement results are shown in FIG. 2.

Thus, it was confirmed that, compared to Comparative Example 3 produced by the coprecipitation method, the smashing of the particles was suppressed in Example 3 produced by supporting nickel on the silica support by the DP method, and thus the filtration rate of Example 3 after pulverization was faster than that of Comparative Example 3.

Therefore, the present invention provides a catalyst for a hydrogenation reaction, including 40-80 parts by weight of nickel as a catalyst active component, 0.01-5 parts by weight of copper as an accelerator, and 10-30 parts by weight of a silica support based on 100 parts by weight of the entire catalyst, it can be confirmed from Table 1 that the crystal size of nickel is reduced, and it can be confirmed from Table 2 and FIG. 5 that the amount of hydrogen consumption is remarkably high. Therefore, it can be seen that the addition of copper makes the hydrogenation activity excellent.

In addition, it can be confirmed from Table 4 that the hydrogenation activity is improved by adjusting the pore structure and the average particle size of the silica support, and it can be confirmed from Table 5 that the hydrogenation activity is improved according to the reduction temperature.

Finally, the changes in the catalyst particle size distribution and the hydrocarbon resin filtration rate before and after smashing can be confirmed from Tables 7 and 8 and FIGS. 1 and 2. As a result, it can be confirmed that the filtration rate of the hydrocarbon resin is higher than the catalyst produced by the coprecipitation method because smashing of the catalyst in which nickel is supported on the support in silica with controlled particle size distribution is suppressed at a high-speed rotation.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for a hydrogenation reaction, comprising, based on 100 parts by weight of the entire catalyst, 60.9-80 parts by weight of nickel as a catalyst active component, 0.01-5 parts by weight of copper as an accelerator, and 10-30 parts by weight of silica as a support, wherein the silica as the support has a specific surface area of 300-400 $m^2/g$ and an average particle size of 3-10 $\mu m$, wherein a crystal size of the nickel is 4.9-6.6 nm.

2. The catalyst of claim 1, wherein an average particle size ($d_{50}$) of the catalyst is 3-10 $\mu m$, and a volume ratio of the catalyst having a particle size of 1 $\mu m$ or less is 10% or less.

3. The catalyst of claim 1, wherein the catalyst has a specific surface area of 150-300 $m^2/g$.

4. A method for producing a catalyst for a hydrogenation reaction, the method comprising:

preparing a first solution by dissolving a nickel precursor in a solvent so that a weight concentration (g/L) of nickel in a solution is 25-250;

preparing a second solution by adding a copper precursor to the first solution so that a weight concentration (g/L) of copper in a solution is 0.01-5;

preparing a third solution by dispersing a silica support in the second solution so that a weight concentration (g/L) of silica in a solution is 10-40;

adding the third solution to a precipitation container, stirring the third solution, and heating the third solution to a temperature of 50-120° C.;

adding a pH control agent to the heated third solution, causing the nickel and copper precursors to form a precipitate, and depositing the precipitate on the solid silica support;

washing and filtering the supported catalyst and drying the supported catalyst at 100-200° C. for 5-24 hours;

sintering the dried catalyst in air at a temperature of 200-500° C.; and activating the sintered catalyst by reducing the sintered catalyst at a temperature of 200-500° C. in a hydrogen atmosphere.

5. The method of claim 4, further comprising passivating the activated catalyst.

6. The method of claim 5, wherein the passivating is performed by passivating the activated catalyst with a nitrogen mixed gas including 0.1-20% oxygen.

7. The method of claim 4, further comprising passivating the activated catalyst by depositing the activated catalyst in a solution including a hydrocarbon resin.

8. The method of claim 4, wherein the precipitation is performed at pH 7-9.

9. A method for hydrogenating a hydrocarbon resin, wherein the hydrocarbon resin is brought into contact with hydrogen in the presence of the catalyst produced by the method of claim 4.

\* \* \* \* \*